United States Patent [19]
Faucette

[11] 3,857,244

[45] Dec. 31, 1974

[54] ENERGY RECOVERY AND CONVERSION SYSTEM

[76] Inventor: Reese E. Faucette, 11315 Crestfield Dr., Huntsville, Ala. 35803

[22] Filed: Nov. 2, 1973

[21] Appl. No.: 412,340

[52] U.S. Cl............................. 60/641, 165/45, 415/64
[51] Int. Cl. .................................................. F03g 7/00
[58] Field of Search........................... 165/45; 60/641

[56] References Cited
UNITED STATES PATENTS
3,274,769  9/1966  Reynolds ............................. 165/45

Primary Examiner—Martin P. Schwadron
Assistant Examiner—Allen M. Ostrager

[57] ABSTRACT

A heat energy recovery system for extracting heat from earth cavities in which a heat exchanger is placed in a cavity and coupled in a closed loop heat exchange arrangement with an above ground heat exchanger. Particular use is made of the liquid head in a pipe going down to the heat exchanger in the cavity to create substantial pressure to operate an expansion valve at the lower heat exchanger where evaporation occurs to enhance heat exchange. This system also discloses new arrangements of fluid energy division and temperature amplification to enhance operation of the system.

26 Claims, 13 Drawing Figures

ENERGY RECOVERY AND CONVERSION SYSTEM

BACKGROUND OF THE INVENTION

Beneath every square foot of the earth's crust is heat. The rate at which the temperature within the crust increases in relation to the depth at which the heat is found is known as the "geothermal gradient."

In areas of normal crustal heat, this geothermal gradient is approximately 1°F. increase per sixty feet of descent. However, there are many areas designated as "geothermal reservoirs" where the gradient is approximately 1°F. per 30 feet of descent; and in some geothermal reservoirs even greater heat is available very close to the surface.

Several systems have been designed, developed, and put into use for the recovery of energy in areas of notable geothermal reservoirs. Practically all of these rely on high temperature output from shallow wells. The invention revealed in this document does not depend upon high heat close to the surface of the earth; this system operates also in areas of normal geothermal gradient where the heat is much deeper within the earth's crust than it is in geothermal reservoirs.

It was once feared among certain geologists that, because of the low conductivity of the stone from which the heat was being drawn, the flow of energy might rapidly drain the heat reserves from around the energy wells drilled into the geothermal reservoirs. Practical usage, however, seems to indicate that the subterranean area retain their temperatures remarkably well, probably because of extensive circulation of heated water deep within the earth's crust. There is reason to believe that this apparent deep circulation of heated subterranean waters is present anywhere within the earth's crust; even if a well were to be drilled into dry rock, heat could be brought from tremendous depths by convection currents within water introduced into the well by the driller. Technical know-how is available to cope with such problems as drilling through deep-seated beds of salt, gypsum, or other solubles.

One object of this invention is to provide a method and means for utilizing geothermal energy at practically any point on the surface of the earth for power and heat. The invention provides a moderate-temperature, high-pressure energy for such tasks as driving machines, heating boilers, space heating, refrigeration, and flash purification of water. The production of this energy is pollution-free; therefore, a second object is to provide a method for combatting the encroaching pollution that is invading our atmosphere and waters.

A third object is to establish a system for temperature amplification; this will widen the application and efficiency of the energy brought from subterranean depths or other sources. A fourth object is that of introducing methods and means for (a) recovering the heat that is normally dissipated in the vapor-turbine condenser and (b) re-introducing the heat into the pressure system ahead of the turbine so as to greatly increase the efficiency of the energy well and other vaper-producing devices.

SUMMARY OF THE INVENTION

In accordance with the invention, there is provided a spontaneous closed cycling of a liquid-to-gas-to-liquid fluid down into an energy well, back up to the point of injection, through a workload, into a condenser, and back down into the well. It is normally made up of these major components: a workload, which could be a turbine or a heating system; a condenser, in the form of a heat exchanger; a reservoir for containing a reserve of cycling fluid; a well or other heat source that is tapped by means of a heat exchanger; a liquid pipe accumulator extending from the reservoir down into the well to the heat exchanger; and a vapor pipe extending from the heat exchanger up to the turbine.

The well or other access to a heat source is large enough to contain the two pipes. The liquid-carrying, head-developing intake pipe is extended far enough below the well head that the weight of the liquid will build up a pressure sufficient to force the liquid through a one-way nozzle into the heat exchanger. The liquid is evaporated inside the heat exchanger; and the heated, expanding gas is forced to escape through the vapor pipe leading back to the workload recovery system. Condensation takes place in a condenser connected between the workload and the well. The condensed liquid is dropped again through the liquid pipe, and the cycle is repeated. As one feature of this invention, a workable level of fluid is ensured through the use of a reservoir. In accordance with other features of the system, efficiency in the recovery of energy from the heated vapor expelled by the well is increased by the use of an energy divider to provide temperature amplification, and the overall efficiency is increased by the use of a refrigeration cycle or an energy divider to recover energy normally lost in the condenser. An energy divider is a well-known device which receives a fluid at one temperature and discharges a portion of it at a higher temperature than the input temperature and a portion of it at a lower temperature than the input temperature. An example of such a device is disclosed by U.S. Pat. No. 3,361,336.

DETAILED DESCRIPTION OF THE INVENTION

Figure 1:
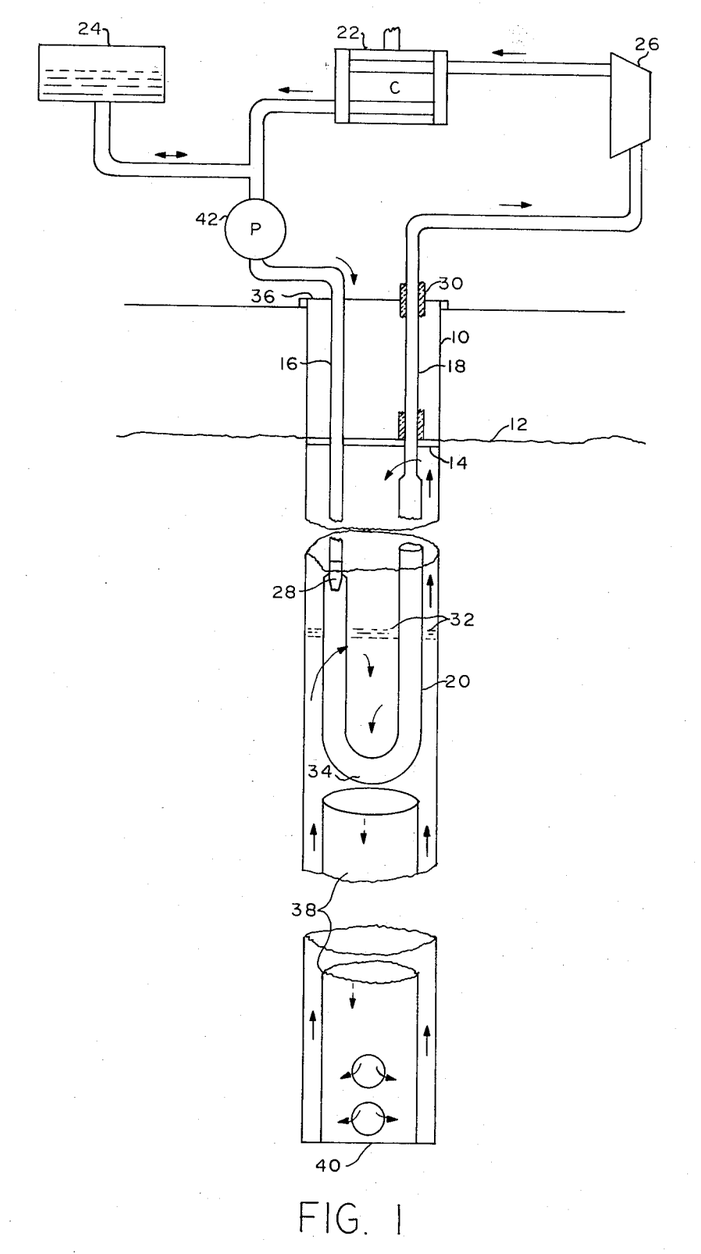
FIG. 1 is a schematic diagram of an energy conversion system as contemplated by this invention.

Referring initially to FIG. 1, it is contemplated that a well of a diameter of 8 to 12 inches be drilled into the earth as far as it is deemed suitable. Typically, the depth may be between 500 and 40,000 feet. A casing 10 is inserted in the well down to bedrock 12 and a seal 14 installed in the well at a depth of 100 to 4,000 feet to prevent contamination of the well by cool surface water. Two pipes, a cold fluid or injection pipe 16 and a hot vapor or discharge pipe 18 extend from the surface down to heat exchanger 20. At the surface, cold fluid injection pipe 16 is connected to and receives a liquid input from the output of condenser 22 and reservoir 24. Hot vapor discharge pipe 18 is connected at the surface of the input of a workload represented by turbine 26. The fluid output of turbine 26 is connected to the input of condenser 22.

The bottom end of cold fluid injection pipe 16 feeds the input of heat exchanger 20 through one-way discharge nozzle 28 and provides a one-way path for injecting liquid from pipe 16 into heat exchanger 20. This flow is accomplished by virtue of the fluid pressure built up by virtue of the head of liquid in pipe 16, e.g. 1,000 to 5,000 PSIG. Thus, for example, with a fluid of $CO_2$ at 50°F. and with an 8,000 foot length of pipe 16, the pressure at nozzle 28 would be approximately 3,600 PSIG. With the release in pressure which occurs across nozzle 28, the $CO_2$ liquid evaporates and then due to the temperature of the ground liquid surrounding heat exchanger 20, the now vapor expands and heat flow is rapidly accelerated upward through heat exchanger 20 and pipe 18 producing a gas pressure of 1,000 to 6,000 PSIG at a temperature of 100°F. to 700°F. at the intake of turbine 26. Turbine 26 is thus driven and gaseous output condensed in condenser 22, providing an output temperature of 30°F. to 85°F. and pressure 500 to 1,060 PSIG, and this fluid is then reintroduced into the well known down through injection pipe 16, and the process repeated. In order to reduce heat losses, hot vapor discharge pipe 18 may be surrounded by insulation 30. The heat from the earth supplied to heat exchanger 20 is provided first by ground water 32 which tends to circulate with hot water rising around a portion of heat exchanger 20 and the resulting cooler water occurring by virtue of the heat transferred to heat exchanger 20 tends to move downward in the well. Depending upon the desired heat exchange and water temperatures, heat exchanger 20 may extend for varying depths, e.g., several thousand feet below the injection nozzle, perform a U-turn 34 and return upward. The well, in turn, may extend several thousand more feet below the heat exchanger. The well is capped at the surface by a plug or cap 36.

In order to assist in the eviction of heat from deep wells which extend significantly below the volume of heat exchanger 20, pipe 38 having a plurality of perforations near well bottom 40 is positioned below heat exchanger 20 so as to rest on well bottom 40. Thus, as shown by the arrows, hot water tends to rise along the outer peripery of pipe 38 to the exchanger 20 and cool water tends to flow downward through the interior of pipe 38 to effect the desired circulation of water in convection of heat.

An injector or compressor 42 may be inserted between reservoir 24 and/or condenser 22 and the top of pipe 16. This arrangement would typically be employed in shallow wells where necessary to increase the head of pressure at the nozzle inlet to the heat exchanger below.

Figure 2:
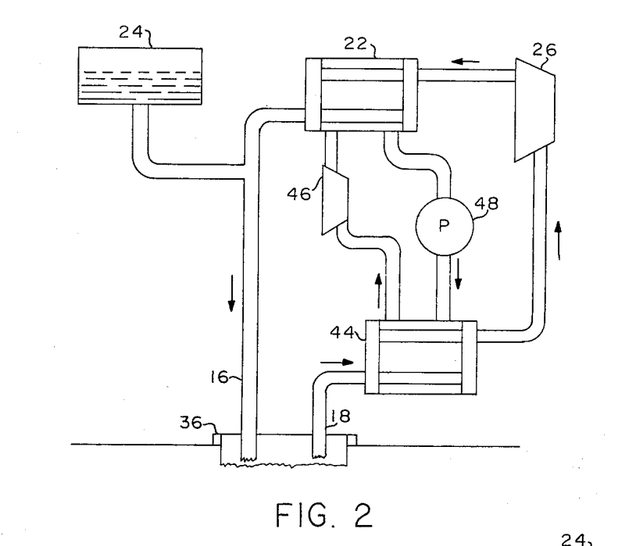
FIG. 2 is a schematic diagram illustrating details of a system where there is provided means for reusing heat normally dissipated in a condenser by elevating its temperature and applying the heat back to the vapor being supplied the workload.

FIG. 2 illustrates an addition to the system providing for re-using heat normally dissipated in condenser 22, connected to the output of turbine 26. In this case, condenser 22 is a heat exchanger which is coupled in a refrigeration system with a preheater heat exchanger 44, expansion valve and/or booster turbine 46, and compressor 48. In operation, heat exchanger 22 provides heat so as to evaporate a refrigerant which is then pumped back to heat exchanger 44 by compressor 48 which then applies this heat to pipe 18 supplying hot input gas to turbine 26. In this fashion, the heat and expansion of the incoming gas from the well builds up so that substantially the entire energy output of the well is dissipated through the workload and mechanical requirements of the working parts, thus providing a great efficiency.

Figure 3:
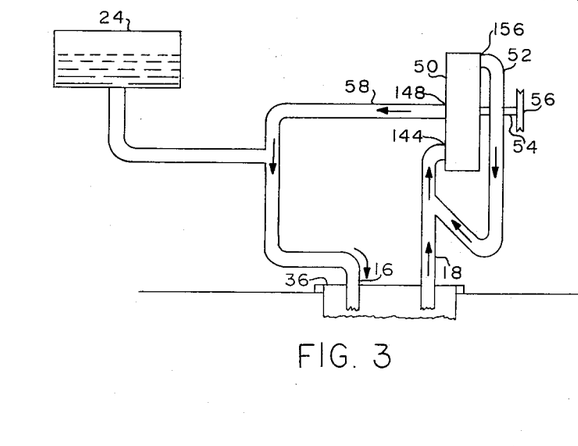
FIG. 3 is a schematic diagram illustrating an alternate arrangement for transporting condenser heat directly back to the workload.

FIG. 3 illustrates an alternate system for transporting condenser heat back into the turbine. In this instance, an energy divider 50 is employed to recirculate the hot gas output 52 of energy divider 50 back into input line 18 to energy divider 50, which is fed from pipe 18 of well. In this case, energy divider 50, which includes a shaft output on shaft 54 to drive load 56, performs both the function of conversion of energy to shaft output and that of condenser and thus avoids the necessity of separate condenser. This feedback of high-temperature gas 52 will build up heat and volume until the energy from the heat from pipe 18 is dissipated to a very high degree in work output from the system. Energy divider 50 provides a cold liquid output 58 as a result of the efficient extraction of work energy, and this output is supplied back to reservoir 24 and intake pipe 16, as shown in FIG. 1.

Figure 4:
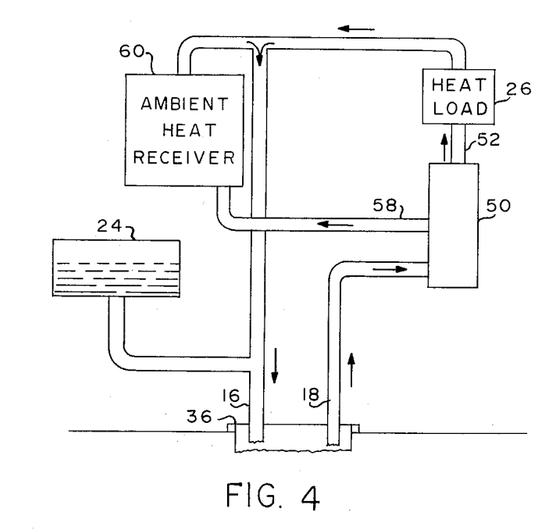
FIG. 4 is a schematic diagram of a detail of the system in which an energy divider is uniquely incorporated as a basic temperature amplifier of vapor being supplied to a workload.

FIG. 4 shows still another system for increasing the portion of energy recoverable from the incoming vapor from pipe 18. In this case, energy divider 50 is utilized as a basic temperature amplifier. The vapor discharged from pipe 18 is introduced directly into energy divider 50 and it discharges a cold stream 58 at a temperature substantially below ambient and substantially below that of the liquid being injected in pipe 16. The hot stream output 52 of energy divider 50 is at a temperature considerably higher than that of the input from pipe 18. Therefore, the input to workload 26 contains an increased quantity of energy absorbed through heat expander 50 and will also contain a portion of energy that had been contained in the cold stream fluid when that fluid was introduced into pipe 16. All of the energy in the hot stream that can be released before the temperature of the hot stream 52 is reduced to that of the injection pipe 16 is essentially recoverable. After the energy has been recovered, the hot stream will be at the temperature of injection fluid, but the cold stream will be at a temperature far below that of the injection fluid. This means that the total energy recovered under this heat amplification system must be more than if the full flow of fluid were to have been reduced in temperature only to that of the injection fluid. The cold stream output of energy divider 50 can pick up this deficit of energy from an ambient environment heat exchanger 60 before rejoining the dissipated hot stream 52 to re-enter injection pipe 16. Environmental heat exchanger 60 may be eliminated if there is sufficient energy available in the well to provide for the amplified heat load.

Figure 5:
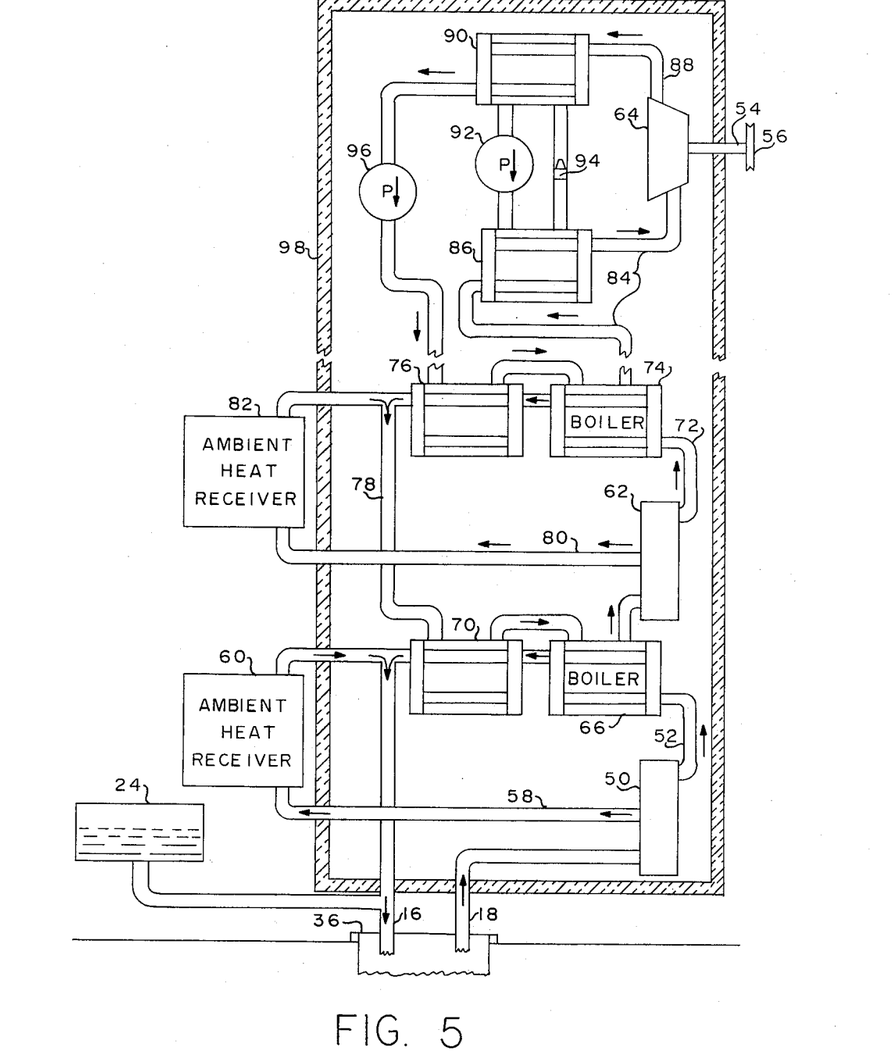
FIG. 5 is a schematic diagram of an energy conversion system having several stages of temperature amplification.

FIG. 5 illustrates still another variation of the system of this invention wherein two energy dividers stages 50 and 62 and a turbine stage 64 are serially arranged to provide temperature amplification with respect to the temperature of heated gas supplied from hot vapor discharge pipe 18 to first stage energy divider 50. In the first stage, the hot gas output 52 of energy divider 50 at an amplified temperature is supplied through pipe 52 to heat exchanger or boiler 66 where it applies heat to a circulating fluid which in turn is supplied via pipe 68 to energy divider 62 of the next energy divider stage. The hot gas output 52, leaving boiler 66, is supplied to a counter-flow heat exchanger 70 where it is cooled and condensed by the condensed output of the next energy divider stage. The condensed fluid from condensing heat exchanger 70 is then returned to the well together with the cold fluid output 58 of energy divider 50 as warmed by environmental air heat exchanger 60. In the next heat divider stage 62, the heated fluid of that stage, e.g., 62, as heated in boiler 66, is supplied to the input of energy divider 62. The hot gas output of same is used to supply heat via supply line 72 to boiler 74. After providing this heat, condensed in condenser 76 and returned around the loop of system, through pipe 78, together with a cold gas output 80 of energy divider 62 as warmed by environmental heat exchanger 82, to the cool liquid input of condensing heat exchanger 70, it absorbs the heat necessary to condense the fluid output from boiler 66.

Work output stage turbine 64 is supplied a heated gas from boiler 74 through pipe 84 which is supplied to the input of turbine 64 through refrigeration cycle preheater heat exchanger 86. The fluid output 88 of turbine 64 is applied through condensing heat exchanger 90 which gives up heat to the refrigeration cycle loop consisting of compressor 92 and expansion nozzle and/or booster turbine 94. Expansion and thus evaporation occurs in heat exchanger 90 to transfer heat from heat exchanger 90 to heat exchanger 86 to increase the temperature of the input fluid to turbine 64 and thus further increase the efficiency of the system. The fluid output of turbine 64 after passing through heat-exchanger-condenser 90 is injected by injector 96 and thus forced back through heat exchanger 76 to boiler 74. As shown, the system is generally enclosed by insulation 98.

Figure 6:
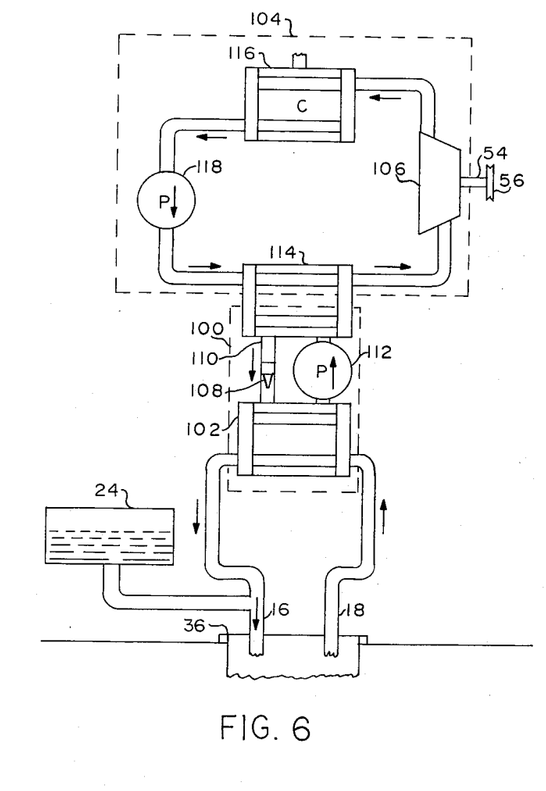
FIG. 6 is a schematic diagram of an energy system in which the vapor output from the well is coupled to the workload through the use of a heat pump which amplifies the temperature of the working medium supplied to the workload.

FIG. 6 illustrates still another variation of this system wherein a heat pump stage 100 is fed heat through heat exchanger 102 and the temperature of the fluid in the heat pump stage 100 amplified therein and fed to a boiler or heat exchanger 114 which heats the fluid of work stage 104 to drive turbine 106. In this embodiment, the heated fluid from hot vapor discharge pipe 18 is supplied through heat exchanger 102 and returned through cold fluid injection pipe 16 to the well. Heat pump stage 100 operates in a conventional manner with nozzle or ventor 108 flushing decompressed fluid in pipe 110 to a gas in heat exchanger 102 to absorb heat from the fluid in pipe 18. Compressor 112 then compresses the refrigerant output of heat exchanger 102 and applies it to heat exchanger 114 where it gives off the absorbed heat at a higher temperature than at which it was received. Work stage 104 operates conventionally. Turbine 106 is driven by the fluid heated in heat exchanger 114 to a gaseous state and the output of turbine 106 is condensed in condenser 116 and pumped by compressor 118 back through heat exchanger 114 to turbine 106. It is to be appreciated that multiple stages of this system may be employed as in the case of previously described multiple stage energy divider system.

Figure 7:
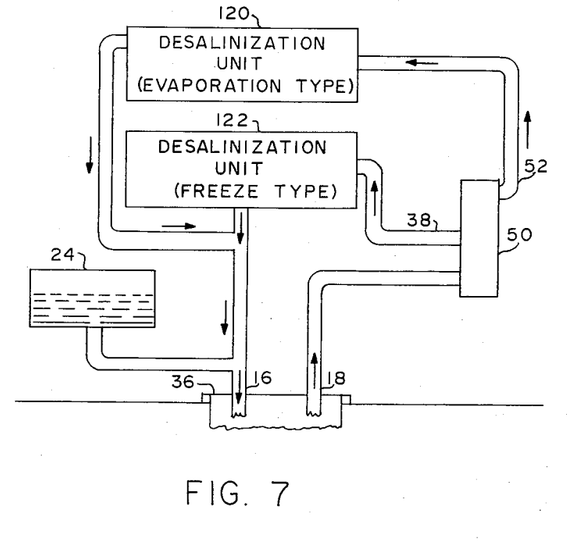
FIG. 7 is a schematic diagram of an energy system constructed in accordance with the invention and embodied in a desalinization plant.

FIG. 7 illustrates the application of the present invention to a desalinization process. In this system, the hot vapor output from hot vapor discharge pipe 18 is applied to the input of energy divider 50 and the amplified temperature gas at output 52 of energy divider 50 is applied to an evaporation-type desalinization unit 120. The cold gas output 38 of energy divider 50 is used to operate a freeze-type desalinization unit 122. The outputs of desalinization units 120 and 122 are combined and supplied back into the well through cold fluid injection pipe 16. Typically, the hot gas released from pipe 18 would be at a temperature of approximately 175°F. under pressure of approximately 1,100 PSI. The hot gas output temperature of energy divider 50 applied to evaporation desalinization unit 120 would be at approximately 600°F. and the cold gas output of energy divider 50 applied to freeze desalinization unit 122 would be approximately at −20°F. It is apparent that considerably more desalinization may be accomplished with this arrangement than may be accomplished by introducing all the vapor directly from the source to desalinization unit at 175°F.

Figures 8, 9:
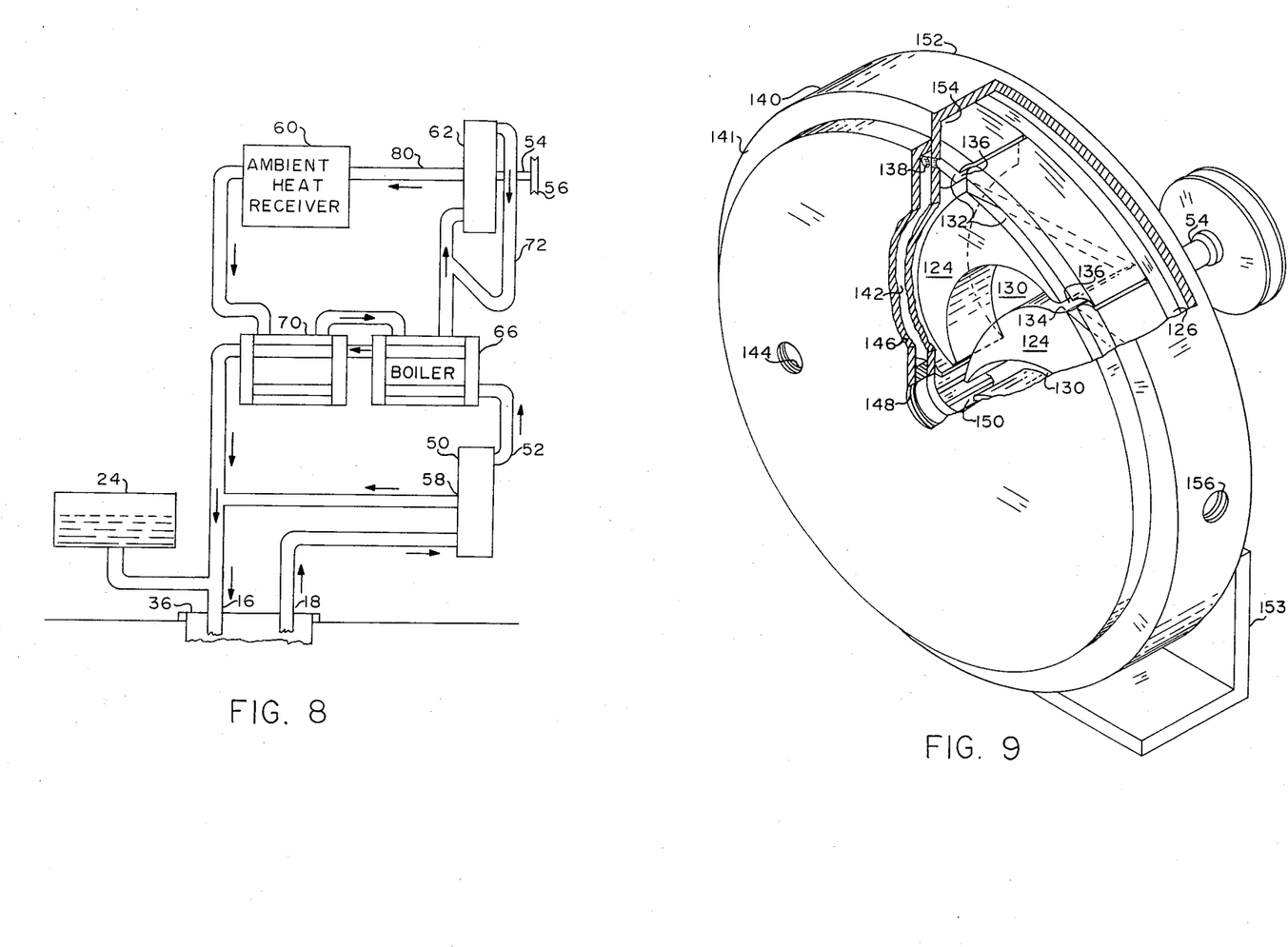
FIG. 8 is a schematic diagram of an energy system employing two stages of temperature amplification.
FIG. 9 is a perspective view, partially broken away, of an improved energy divider-energy converter.

FIG. 8 illustrates still another variation of the invention wherein two stages of temperature amplification are employed and the work output of the system is obtained from a turbine-type energy divider 62, the work output being illustrated as being applied to shaft unit 54.

To trace the flow of operation of this system, hot vapor from pipe 18 is applied to the input of energy divider 50. The hot gas output of this energy divider is applied to boiler heat exchanger-boiler 66, which heats the fluid which powers energy divider-converter 62. The fluid used for heating boiler heat exchanger 66 passes from this heat exchanger to heat exchanger-condenser 70 and then as a liquid to injection pipe 16 of the well. In addition, the cold gas output 58 of energy divider 50 mixes with this fluid as it is supplied to injection pipe 16.

The hot vapor input to energy divider-converter 62 operates shaft 54 supplying work to output 56, then the gases are divided into two streams, hot gas stream which exits through line 72 and is recirculated back to the input of energy divider-converter 62 to further increase the efficiency of its operation. The cold gases exit through line 80 and are warmed in environmental air heat exchanger 60 before passing back through condenser-heat exchanger 70 and to boiler-heat exchanger 66, where additional heat is picked up from the hot gas output 52 of energy divider 50, which in turn receives energy from hot vapor line 18. Typically, the fluid in circuit in energy divider-converter stage 62 is $CO_2$, ethane, or isobutane. However, other fluids such as water may be employed, depending upon the available heat source.

FIG. 9 illustrates an improved energy divider adapted to function simultaneously as a turbine. Because in acting as a turbine, the hot stream line may be used to re-inject into the intake line energy normally lost in a condenser (see FIG. 3), it is classified as a regenerating energy divider. It is superior to other known energy dividers because the division of energy is brought about by splitting the gas into two streams as it leaves the turbine blades rather than prior to being ejected in a reaction configuration or prior to striking any blades. This provides the marked advantage of making full use of all feeder gases to exert pressure on the turbine blades and create torque before any splitting takes place. This means that the turbine will provide full work power, less only a small loss brought about in the splitting process later.

A basic regenerating energy divider utilizes only a single set of eight blades 124, mounted on a rotor 126. Rotor 126 in turn is affixed to a shaft 54 that is mounted in a packed bearing now shown. The eight blades 124 are constructed so as to be interspersed with narrow scrolled interblade channels 130. Arcing lead-in channels 132 that receive injected gases curve across the broad fronts of blades 124 at a constant distance from the center of rotor 126 at approximately fourth-fifths of the distance between the rotor center and the perimeter of the blades. These lead-in channels 132 are tapered through the depth of the turbine blades 124. The taper feathers in at the extreme counterclockwise edge of blades 124 and deepens the channel 132 in a clockwise direction from the beginning. The counterclockwise edge of each blade 124 presents a flat face 134 in front of the deep clockwise opening 136 of the lead-in channel 132 of the counterclockwise neighboring blade 124. Each lead-in channel 132 carries input gas so as to strike the flat face 134 of the clockwise neighboring blade 124 at an impinging angle of approximately 80°. The arcing format of lead-in channels 132 ensures a constant, unvarying inpingement by the incoming gas against the stream-splitting flat faces 134 of blades 124 despite the changing positions of the lead-in channels 132 in relation to input jets 138 mounted in and penetrating the front of turbine housing 140.

Rotor 126 revolves inside a turbine housing 140 that fits closely against the blade side of rotor 126. An intake manifold 142 encircles the front of the turbine to feed incoming gases to eight injection orifices 138 set evenly in a circle directly above the lead-in channels 132 in rotor blades 124. The injection orifices are angled in a clockwise direction through turbine housing 140, so as to inject incoming gases into the lead-in channels 132 at an angle of approximately 20° in relation to the plane of rotor 126 rotation. An intake orifice 144 penetrates the front wall 146 of the intake manifold 142. A cold stream exit orifice 148 penetrates the center of the front manifold cover 146, providing an exit for the cold stream manifold 150 in the center of blades 124. The front wall 141 and back wall 152, which is attached to mounting bracket 153, are held together as a single unit by means of a hot stream manifold 154 encircling the perimeter of rotor 126 and blades 124. A hot stream exit orifice 156 is situated in the outer wall of hot stream manifold 154.

Pressurized gas at intermediate temperature is introduced through intake orifice 144 into intake manifold 142. The gas leaves intake manifold 142 through eight injection orifices 138 and is injected into lead-in channels 132 directly behind front wall 141 of turbine housing 140. The released gas passes through the arcing lead-in channels to strike against flat faces 134 of neighboring clockwise blades 124 at an impinging angle of approximately 80°. The impinging gas exerts pressure and causes clockwise rotation of rotor 126 and blades 124; then the gas splits into two streams against flat faces 134. The stream that splits and flows from the 80° side of the impinging angles is directed toward the perimeter of the rotor through scrolled inter-blade channels 130 that bend this portion of the discharge flow into the direction of rotation. This causes this portion of the gas to discharge at tremendous speed so as to build up a very high temperature as it enters the hot stream manifold 154. It is discharged at a high temperature through hot stream exit orifice 156. The stream that splits and flows from the 100° side of the impinging angles on flat faces 134 moves through scrolled inter-blade channels 130 so as to drop practically motionless (in relation to rotor 126 rotation) into the cold stream manifold 150 at the center of rotor 126. This stream is discharged at a very low temperature through the cold stream exit orifice 148.

Figure 10:
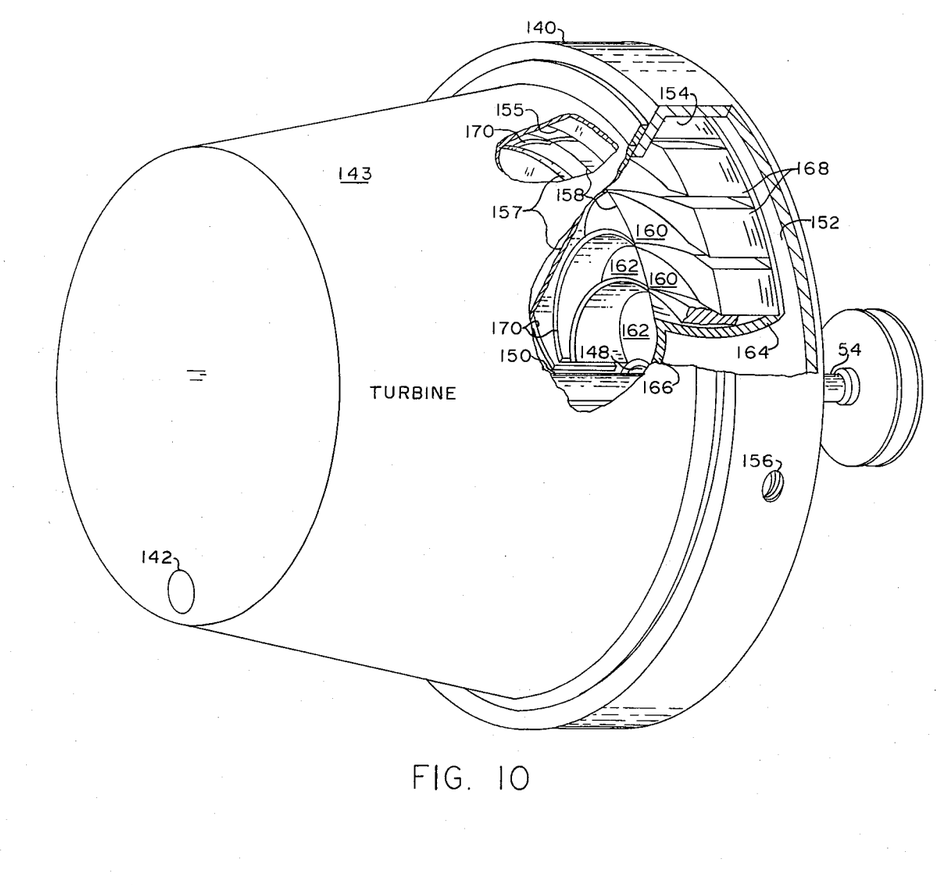
FIGS. 10, 11, and 12 are perspective views, partially broken away, of alternate forms of an energy divider-energy converter.

The regenerative energy dividing system of this invention may be incorporated into a turbine 143 fitted with multistage rotor blades as shown in FIG. 10. Injected gases at intermediate temperature are introduced through intake manifold 142 of turbine 143 and expand through multi-stages of stationary and rotating blades being discharged through circular slot 155 formed in annular closing wall 157 of turbine 143. Following this slot 155 is a circular stream divider 158 in the form of a thin ring. Stream divider 158 is affixed to and rotates with shaft 54 and the rotating blades. This ring stream divider 158 is of such diameter that approximately 30 percent of the gases discharging from the turbine blades will pass outside ring stream divider 158 and approximately 70 percent will pass inside ring stream divider 158 as they escape from the turbine blades. Affixed to and in conjunction with ring stream divider 158 are a hot stream trap 160 outside ring stream divider 158 and a cold stream trap 162 inside ring stream divider 158.

The back wall 164 of hot stream trap 154 is shaped somewhat in the manner of the outside of a deflated doughnut, and it slopes back from ring stream divider 158 in an encircling concave curve from the ring stream divider 158 to the rear turbine housing wall 152 a short distance behind ring stream divider 158, and extends away from the axis of shaft 54 to a point a short distance outside the perimeter of the turbine blades. Hot stream trap 160 bends the flow of gases in the hot stream so that the gases are discharged outwardly from the perimeter of hot stream trap 160 into hot stream exhaust manifold 154, which encircles hot stream trap 160.

The back wall 166 of cold stream trap 162 is shaped somewhat in the manner of the inside of a deflated doughnut, and slopes back from ring stream divider 158 in an encircled concave curve from ring stream divider 158 to a center hole that matches a center outlet in rear wall 152 of turbine housing 140, the whole forming a part of cold stream exit manifold 150. Cold stream trap 162 bends the flow of gases in the cold stream so that these gases are discharged inwardly to the center of cold stream trap 162, which is in effect a part of cold stream exit manifold 150.

A series of scrolled blades 168 are incorporated into hot stream trap 160. These are mounted vertically along the axis of shaft 54. They lead from ring stream divider 158 in a forward scrolled configuration and extend to the perimeter of hot stream trap 160 where they are curved foward into the direction of rotor rotation. As the hot gas stream enters hot stream trap 160, scrolled blades 168 direct the gases into a forward arcing motion as the gases move outward in the curve of back wall 164 toward the perimeter of hot stream trap 160. The hot gas stream gases are thus discharged into the direction of rotor rotation at a very high rate of speed into hot stream exit manifold 154.

Another series of scrolled blades 170 are incorporated into cold stream trap 162. They lead from the ring stream divider 158 in a backward scrolled configuration, and extend to the center of cold stream trap 162 where they are curved backward away from the direction of rotor rotation. As the cold stream enters cold stream trap 162, scrolled blades 170 direct the gases in a backward arcing motion as the gases move inward in the curve of back wall 166 toward the center of cold stream trap 162. The cold stream gases are thus discharged into cold stream manifold 150 in a movement that is practically stationary in relation to the rotor rotation.

Hot gases are withdrawn from the turbine at a very high temperature from hot stream exit orifice 156; cold gases are withdrawn at a very low temperature from cold stream exit orifice 148.

Another configuration of the regenerative-energy dividing system of this invention not illustrated involves the use of a set of hot gas inter-blade channels 130, as illustrated in FIG. 10, with a multi-stage series of blades behind the initial blades. In this case, the hot gas is withdrawn from the turbine at the first set of blades, and the cold gas continues through the set of multi-stage blades. The cold gas is then withdrawn following the multi-stage blades through the cold stream trap with center-exit scrolled blades. The cold stream trap in this case is built with sufficient circumference to capture the entire gas stream emerging from the multi-stage blades.

Figure 11:
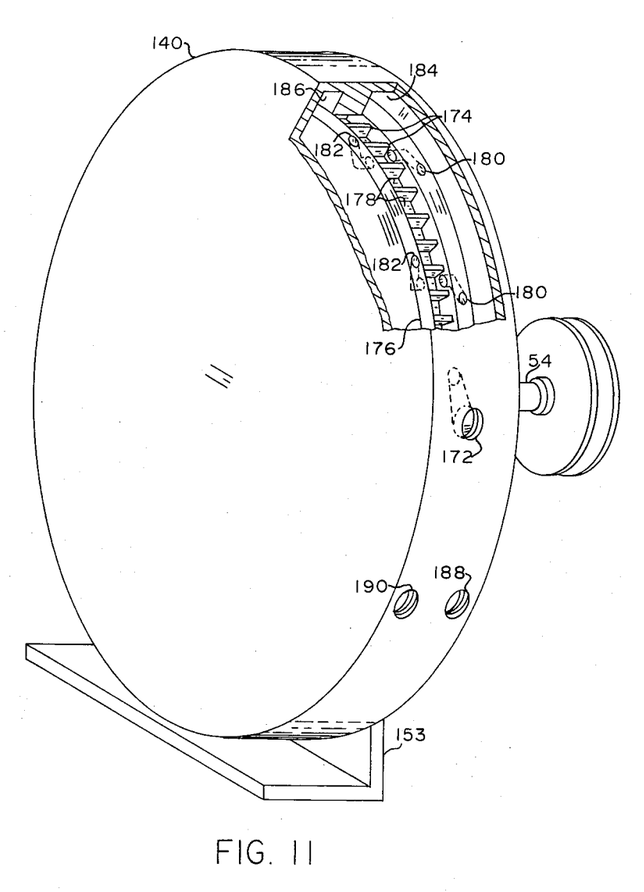

FIG. 11 demonstrates an alternate configuration for a regenerative turbine designed to perform also as an energy divider. In this instance, gas under pressure is introduced through orifice 172 (there may be multiple orifices 172 around the perimeter of housing 140 which is supported by mounting bracket 153). The gas strikes against blades 174 so as to turn rotor 176 to which blades 174 are attached. The incoming gas, upon striking blades 174, is entrapped temporarily in chamber 178 that encircles the blades inside housing 140. The gas is released from chamber 178 through exit orifices 180 and 182 (these may be multiple). That gas exiting through orifice 180 is released into cold gas manifold 184 in a direction opposite to the spin of rotor 176. Henceforth, this gas will be referred to as the cold gas. That gas exiting through orifice 182 is released into hot gas manifold 186 in a direction the same as the spin of rotor 176. Henceforth, this gas will be referred to as hot gas. The cold gas is released from cold gas manifold 184 through cold gas exhaust orifice 188; the hot gas is released from hot gas manifold 186 through hot gas exhaust orifice 190.

Figure 12:
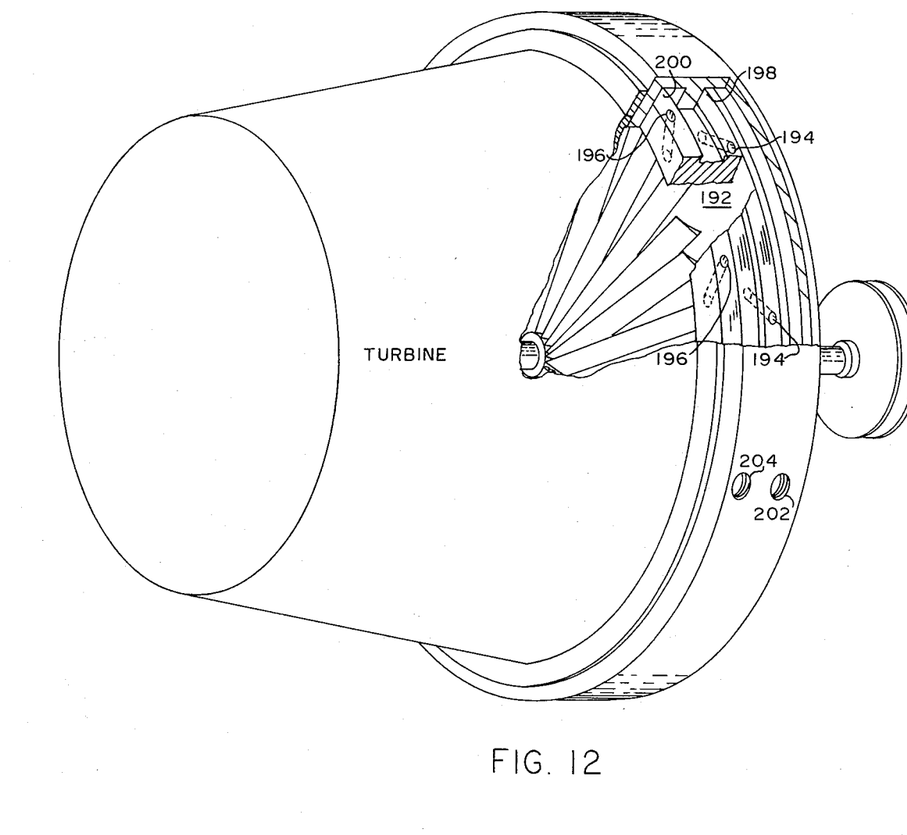

FIG. 12 demonstrates another alternate configuration for combining an energy dividing system with a standard multiple-blade turbine. In this instance, the incoming gas flows through the turbine and enters rear chamber 192, from where it is driven by centrifugal force toward the outer perimeter of chamber 192 so as to be released under pressure through exit orifices 194 and 196 (these may be multiple). That gas exiting through orifice 194 is released into cold gas manifold 198 in a direction opposite to the spin of the rotor; henceforth, this gas will be referred to as the cold gas. That gas exiting through orifice 196 is released into hot gas manifold 200 in a direction the same as the spin of the rotor; henceforth, this gas will be referred to as the hot gas. The cold gas is released from cold gas manifold 198 through cold gas exhaust orifice 202; the hot gas is released from hot gas manifold 200 through hot gas exhaust orifice 204.

Figure 13:
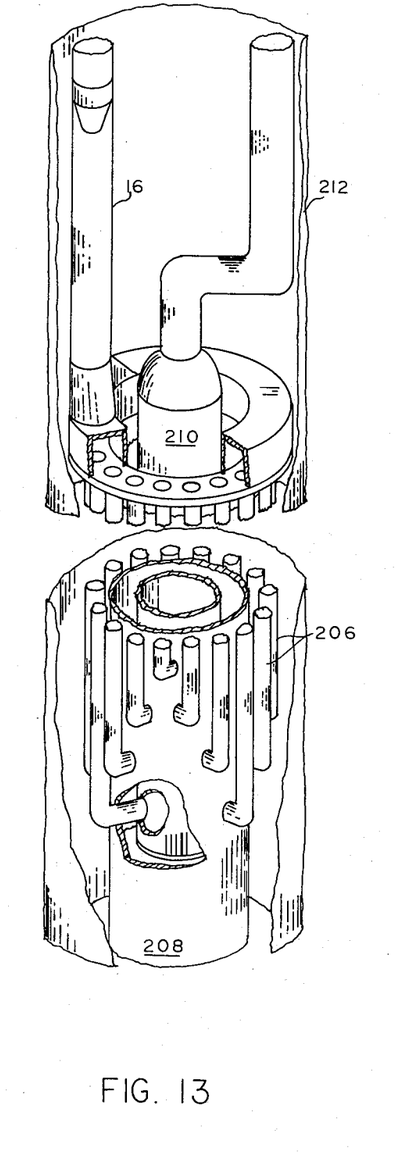
FIG. 13 is a partial perspective view of a reverse flow heat exchanger that may be inserted into a well.

FIG. 13 is a partial perspective view of a reverse-flow heat exchanger that may be inserted into a well for recovery of geothermal energy. There are a number of small down-flow $CO_2$-carrying pipes 206 set in a circle around a large convection pipe 208. Inside convection pipe 208 is a single up-flowing $CO_2$ vapor return pipe 210, which may be coated with insulation under certain circumstances. The whole assembly is so arranged that it may be inserted within wall 212 of the well. Cooled $CO_2$ flows downward through pipes 206 after having been carried into the well within a single injection pipe 16 and through dividing channels into pipes 206. At the bottom of the heat exchanger, pipes 206 are angled inward one by one through the wall of convection pipe 208 to empty into vapor return pipe 210. Return pipe 210 returns the $CO_2$ vapor to the surface. Hot water within the space between wall 212 of the well and convection pipe 208 flows upward around pipes 206. Convection pipe 208 terminates near the top of the heat exchanger, so that the up-rising water, now cooled, flows across the top of convection pipe 208 and returns back to the depths of the well within the space between convection pipe 208 and vapor return pipe 210. Convection pipe 208 may extend far below the heat exchanger, even to the bottom of the well, in order to ensure optimum circulation of water within the well. With this counter-flow system, the $CO_2$ may be heated almost to the initial temperature of the up-rising water, and the up-rising water may be cooled almost to the temperature of the down-flowing $CO_2$. Insulation will be required in those cases when it is desired that the temperature of the up-flowing $CO_2$ vapor be higher than that of the down-flowing water.

What is claimed is:

1. An energy conversion system comprising:
   a first pipe extending downward into a cavity containing environmental heat;
   a heat absorbing heat exchanger positioned in said cavity proximate to the lower end of said first pipe and said heat absorbing means having an inlet and outlet;
   a uni-directional flow nozzle interconnecting the lower end of said first pipe and the inlet of said heat absorbing means, said uni-directional nozzle enabling flow through it from said first pipe to said heat absorbing means;
   a second pipe extending from said outlet of said heat absorbing means upward to the upper end of said cavity;
   a fluid; and a heat load connected to the upper end of said first and second pipes and enclosing said fluid whereby said fluid is vaporized in said heat absorbing means by environmental heat, the resulting vapor flows upward through the said second pipe through said heat load after which it liquifies and forms a pressure head in said first pipe above said nozzle creating the pressure causing the fluid to be forced through said nozzle and again vaporized and the cycle repeated.

2. An energy conversion system as set forth in claim 1 further comprising a pump in circuit with said first pipe for increasing the pressure of fluid in said first pipe between said pump and said nozzle.

3. An energy conversion system as set forth in claim 1 wherein said fluid is $CO_2$.

4. An energy conversion system as set forth in claim 1 further comprising insulation surrounding said second line.

5. An energy conversion system as set forth in claim 1 wherein said heat load includes a turbine having a vapor inlet connected to receive vapor from said second line and a condenser connected to the vapor outlet of said turbine providing a liquid back to said first line.

6. An energy conversion system as set forth in claim 5 wherein:
said condenser comprises a first heat exchanger having a heat emission cavity connected between the output of said turbine and said first pipe;
said system further comprises a second heat exchanger having a heat reception chamber and heat emission chamber, said heat reception chamber being connected in circuit between said second pipe and vapor inlet of said turbine; and
a pair of lines connected between the heat reception chamber of said first heat exchanger and heat emission chamber of said second heat exchanger, one of said lines having in circuit therewith a pump and the other having in circuit with it pressure reduction means whereby heat output from said first heat exchanger achieves condensation of the output of said turbine and transfers a substantial part of the heat given off to said second heat exchanger which preheats vapor from said second line supplied to said turbine.

7. An energy conversion system as set forth in claim 5 further comprising a reservoir interconnected to the output of said condenser and said first line adapted to provide a storage of fluid assuring a constant source of fluid to said first line.

8. An energy conversion system as set forth in claim 1 wherein said first pipe extends downward into a cavity a distance of not less than 500 feet.

9. An energy conversion system as set forth in claim 1 further comprising a perforated pipe smaller in diameter than said cavity and extending in said cavity below said heat upward to said heat absorbing means from lower levels of said cavity.

10. An energy conversion system as set forth in claim 1 wherein said heat absorbing means comprises:
an annular, input manifold connected to said first line, said input manifold being spaced from the walls of said cavity;
a plurality of pipes extending downward from said manifold over a substantial depth of said cavity and being connected at their lower ends to said second pipe, and said second pipe being positioned centrally with respect to said plurality of pipes; and
a cylindrical member extending downward from said manifold between said plurality of pipes and said second pipe for a substantial depth in said cavity, whereby water in said cavity may circulate upward around said plurality of pipes, over the top of said manifold and down between said cylindrical member and said second pipe in response to the effect of heat being absorbed by said plurality of pipes.

11. An energy conversion system as set forth in claim 1 further comprising a well seal position at a selected level in said cavity for providing a seal between the inner periphery of said cavity and said pipes.

12. An energy conversion system as set forth in claim 1 further comprising energy division means in circuit with said heat load, said heat division means including means responsive to a vapor input to provide as a first output a lower temperature vapor to said first pipe than the temperature of said vapor input and for providing a second output, to said heat load, which is of a higher temperature than vapor to said input.

13. An energy conversion system as set forth in claim 12 further comprising an ambient air heat exchanger coupled between said first output of said energy division means and said first pipe whereby the vapor output of said first output is preheated before being fed to said first pipe.

14. An energy conversion system as set forth in claim 12 wherein said heat load is an evaporator.

15. An energy conversion system as set forth in claim 12 further comprising a liquid freezer coupled in circuit between said first output of said energy division means and said first pipe.

16. An energy conversion system as set forth in claim 12 wherein said energy divider comprises:
a generally circular rotatable member including shaft means for centrally supporting said member;
a plurality of blades extending radially on said rotatable member and adapted to produce rotation of said member upon the application of said vapor input to said blades;
first and second fixed mounted, annular exhaust manifolds, each having a wall positioned adjacent to the periphery of said blades, there being included in one of the wall portions of said first manifold at least one orifice forming an exhaust passageway from said blades to said first manifold, the exit of which orifice is oriented whereby vapor is directed into said first manifold along a first circumferential direction, and there is included in one of the wall portions of said second manifold at least one second orifice forming an exhaust passageway from said blades to said second manifold, the exit of said second orifice being oriented whereby gases are directed into said second manifold along a circumferential direction opposite to said first named circumferential direction;
enclosure surrounding said circular rotatable member and said blades;
whereby as said circular rotatable member is rotated and vapor discharged from said blades, it is divided into two paths, one path being a hot vapor path generally along the direction of rotation of said rotatable member to provide said second output, and the other path being a cold vapor path out along a direction opposite to the direction of rotation of said rotatable member to provide said first output.

17. An energy conversion system as set forth in claim 16 wherein said blades extend between said manifolds.

18. An energy conversion system as set forth in claim 17 wherein said blades extend between said manifolds.

19. An energy conversion system as set forth in claim 16 wherein said blades are positioned radially inward of said manifolds.

20. An energy conversion system as set forth in claim 16 wherein rotary power outlet means are coupled to said shaft means whereby rotary power is extracted from said energy divider.

21. An energy conversion system as set forth in claim 12 wherein said energy divider comprises:
a circular rotatable member including shaft means for centrally supporting said member and rotating it;
a first set of a plurality of curved blades, each having a cupped curvature on its forward face with respect to a selected direction of rotation, said blades extending outward to an annular position intermediate between the center of said member and its periphery;
a second set of a plurality of curved blades, each extending outward from the outer termination of said first set of blades, and each having a cupped forward face and wherein the spacing between blades decreases with outward radial distance;
flow separation means supported by said rotatable member and separating said first and second sets of blades and preventing flow from one set to the other;
an enclosure surrounding said rotatable member and blades;
an annular said vapor input opening in said enclosure adjacent to said flow separation means for directing a split input flow of vapor into regions between both sets of first and second sets of blades;
a first said output in the center region of said enclosure and a second outlet in outer region of said enclosure;
whereby a portion of vapor supplied through said annular input is directed radially between said first set of blades inward to said first output and is cooled thereby, and a portion of said vapor is directed radially outward between said second set of blades to said second output to provide a hot vapor outlet and thus said gases directed inward are cooler than the inlet vapor and the gases directed outward are hotter than said inlet vapor.

22. An energy conversion system as set forth in claim 12 wherein said energy divider comprises:
a circular rotatable member including shaft means for centrally supporting said member;
a plurality of blades extending from a point just outward of the center of said rotatable member to its periphery, said blades having a concave forward face and convex after surface, the thickness of each blade increasing with radial distance to a maximum thickness in a peripheral region;
a slot extending from a side edge of each said blade diagonally through said peripheral region and exiting at a forward surface, the exit thus obtained facing the after surface of the next preceeding blade;
an enclosure surrounding said rotatable member and including a vapor inlet gas manifold on a side of said enclosure having at least one jet opening interfacing with said slots, a hot gas exhaust manifold outward of the periphery and around the outer circumference of said blades, and a cold gas exhaust manifold extending from the center region between the radially inner ends of said blades; and
whereby input vapor applied to said inlet manifold as said vapor input provides at least one jet of vapor from said manifold to said slots, causing said member to rotate and a hot vapor portion of said vapor to flow upward to said hot gas exhaust manifold as said second output and cold vapor portion of said vapor to flow inward to said cold gas exhaust manifold as said first output.

23. An energy conversion system as set forth in claim 1 wherein said heat load comprises:
a temperature amplifier having a pair of input fluid couplings and a pair of output fluid couplings comprising:
first, second and third heat exchangers, said first and second heat exchangers each having a heat reception chamber and heat emission chamber and said third heat exchanger having a heat reception chamber, and each chamber having an inlet and outlet, energy division means having an inlet and low temperature and high temperature outlet and including means for providing at said low temperature outlet a vapor of a temperature lower than applied to said inlet and for providing at said high temperature outlet vapor at a higher temperature than received at said inlet,
said high temperature outlet of said energy division means being connected to the inlet of the heat emission chamber of said first heat exchanger, the outlet of said heat emission chamber of said first heat exchanger being connected to the inlet of the heat emission chamber of said second heat exchanger and the outlet of said heat emission chamber of said second heat exchanger being connected to the upper end of said first pipe,
said second pipe being connected to said inlet of said energy division means, one of said fluid input couplings of said amplifier,
said low temperature outlet of said energy division means being connected through said heat reception chamber of said third heat exchanger, via said inlet and outlet of said last named heat reception chamber, the other of said input fluid couplings, to said upper end of said first pipe; and
a fluid heat load being connected from said first inlet of said heat reception chamber of said second heat exchanger, one of said output fluid couplings, out through the outlet of said heat reception chamber of said second heat exchanger, in through said first inlet of said heat reception chamber of said first heat exchanger and out through the outlet of said heat reception chamber of said first heat exchanger, the other output fluid coupling.

24. An energy conversion system as set forth in claim 23 wherein said third heat exchanger comprises an atmospheric heat exchanger adapted to receive heat and apply the received heat to said heat reception chamber of said third heat exchanger.

25. An energy conversion system as set forth in claim 23 wherein said heat load comprises vapor powered engine heat coupled to said pair of output fluid couplings of said temperature amplifier and having a vapor inlet and outlet and further comprising a heat pump means interconnected between said inlet and outlet for transferring heat received from the fluid outlet of said vapor powered engine back to the fluid inlet of said vapor powered engine.

26. An energy conversion system as set forth in claim 25 further comprising a second like said temperature heat amplifier with its said pair of input fluid couplings connected to the said pair of output fluid couplings of said first temperature amplifier and its said pair of output fluid couplings connected in a circuit with said engine.

* * * * *